United States Patent
Simmons

(10) Patent No.: US 10,239,769 B2
(45) Date of Patent: Mar. 26, 2019

(54) SYSTEM AND METHOD FOR TREATING CONTAMINATED WASTEWATER

(71) Applicant: Atlanta Gold Corporation, Boise, ID (US)

(72) Inventor: Ernest Simmons, Boise, ID (US)

(73) Assignee: Atlanta Gold Corporation, Boise, ID (US)

( * ) Notice: Subject to any disclaimer, the term of this patent is extended or adjusted under 35 U.S.C. 154(b) by 503 days.

(21) Appl. No.: 14/947,153

(22) Filed: Nov. 20, 2015

(65) Prior Publication Data

US 2016/0145134 A1     May 26, 2016

Related U.S. Application Data

(60) Provisional application No. 62/084,659, filed on Nov. 26, 2014.

(51) Int. Cl.
| | |
|---|---|
| *C02F 1/00* | (2006.01) |
| *C02F 1/28* | (2006.01) |
| *C02F 1/70* | (2006.01) |
| *C02F 9/00* | (2006.01) |
| *C02F 101/10* | (2006.01) |
| *C02F 101/20* | (2006.01) |
| *C02F 103/10* | (2006.01) |

(52) U.S. Cl.
CPC .............. *C02F 1/281* (2013.01); *C02F 1/004* (2013.01); *C02F 1/705* (2013.01); *C02F 9/00* (2013.01); *C02F 2101/103* (2013.01); *C02F 2101/20* (2013.01); *C02F 2103/10* (2013.01); *C02F 2303/24* (2013.01)

(58) Field of Classification Search
CPC .......... C02F 1/004; C02F 1/281; C02F 1/505; C02F 1/705; C02F 2101/20; C02F 2101/103; C02F 2103/10; C02F 2303/24; C02F 9/00; B09C 1/002; B09C 1/08
See application file for complete search history.

(56) References Cited

U.S. PATENT DOCUMENTS

| | | |
|---|---|---|
| 5,975,798 A | 11/1999 | Liskowitz et al. |
| 6,132,623 A | 10/2000 | Nikolaidis et al. |
| 6,207,114 B1 | 3/2001 | Quinn et al. |
| 2008/0099385 A1 | 5/2008 | Kim et al. |
| 2011/0174743 A1* | 7/2011 | Huang .................... C02F 1/705 210/758 |

(Continued)

OTHER PUBLICATIONS

Btatkeu-K, et al., "Determining the optimium Fe0 ratio for sustanable granular Fe0/sand water filters" Chemical Engineering Journal, 247, (Mar. 12, 2014), pp. 265-274.*

(Continued)

*Primary Examiner* — Lucas A Stelling
(74) *Attorney, Agent, or Firm* — Osha Liang LLP

(57) ABSTRACT

A process for treating contaminated wastewater that includes flowing the contaminated wastewater into at least one pre-pond solids filter tank comprising sand; flowing the contaminated wastewater from at least one pre-pond solids filter tank into at least one sedimentation pond; flowing the contaminated wastewater from the at least one sedimentation pond into at least one filter tank including sand and a mixture of sand and zero-valent iron; and discharging treated wastewater from the at least one filter tank.

12 Claims, 4 Drawing Sheets

(56) References Cited

U.S. PATENT DOCUMENTS

2011/0266226 A1* 11/2011 Hussam .................. C02F 1/505
                                                      210/669
2012/0247766 A1    10/2012 Hemmings

OTHER PUBLICATIONS

International Search Report and Written Opinion dated Feb. 29, 2016 in corresponding International Application No. PCT/US2015/061555 (10 pages).

International Search Report and Written Opinion dated Jun. 8, 2017, in corresponding International Application No. PCT/US2015/061555 (7 pages).

* cited by examiner

SYSTEM AND METHOD FOR TREATING CONTAMINATED WASTEWATER

BACKGROUND

Many industrial activities employ processes that produce large amounts of wastewater that may be contaminated with species that are persistent environmental pollutants. In particular, the presence of dissolved metals in the aqueous wastewater produced by mining, chemical, pharmaceutical, and metallurgical sites, among others, present serious risks for the contamination of the drinking water supply used by humans and animals within the area of the industrial activity.

For example, arsenic is a common contaminant associated with industrial activities and is considered to represent a hazard to human health in values in excess of 0.01 mg/L (10 ppb) in drinking water. Therefore, the U.S. Environmental Protection Agency (EPA) has adopted this value ($\leq 0.01$ mg/L) as a standard for drinking water, while the World Health Organization (WHO) adopted this value as a worldwide guideline. Similarly, other dissolved metals also possess appropriate standards and guidelines. As a result of these standards, treatment of industrial wastewater is required in many areas in order to produce a treated stream of wastewater within which dissolved metal contaminants have been either completely removed or are present in levels accepted by regulatory agencies as being safe for discharge into the environment.

In addition, in regions where industrial activities were in operation prior to the implementation of standards for contaminant levels in discharged wastewater, the soil, and in turn groundwater sources, may already be compromised and contain unacceptable levels of dissolved or leachable metals and/or organic contaminants. Thus, a similar treatment may be necessary for the groundwater to be safely used as a drinking water supply or for irrigation purposes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for treating contaminated wastewater that includes flowing the contaminated wastewater into at least one pre-pond solids filter tank comprising sand; flowing the contaminated wastewater from at least one pre-pond solids filter tank into at least one sedimentation pond; flowing the contaminated wastewater from the at least one sedimentation pond into at least one filter tank including sand and a mixture of sand and zero-valent iron; and discharging treated wastewater from the at least one filter tank.

In another aspect, embodiments disclosed herein relate to a system for the treatment of contaminated wastewater that includes at least one pre-pond solids filter tank, including sand, configured to receive contaminated wastewater; at least one sedimentation pond configured to receive contaminated wastewater from at least one pre-pond solids filter tank; and at least one filter tank, comprising at least one layer of sand and at least one layer of a mixture of sand and zero-valent iron, configured to receive contaminated wastewater from at least one sedimentation pond.

In yet another aspect, embodiments disclosed herein relate to a method of grouting an abandoned wellbore that includes emplacing a grouting composition comprising zero-valent iron into the abandoned wellbore.

Other aspects and advantages of the claimed subject matter will be apparent from the following description and the appended claims.

DETAILED DESCRIPTION

In one aspect, embodiments disclosed herein relate generally to a system and method for treating contaminated wastewater using zero-valent iron (ZVI). The system and method employing ZVI may be particularly beneficial for the treatment of any water source that is contaminated with dissolved metals or organic contaminants. This may include groundwater sources, mining wastewater/tailings, or other industrial wastewater. The generality, low-energy demand, and relatively low-maintenance nature of the system and method may allow for their adoption in a variety of contexts to provide treated water that is capable of meeting or exceeding increasingly stringent environmental regulations.

Figure 1:
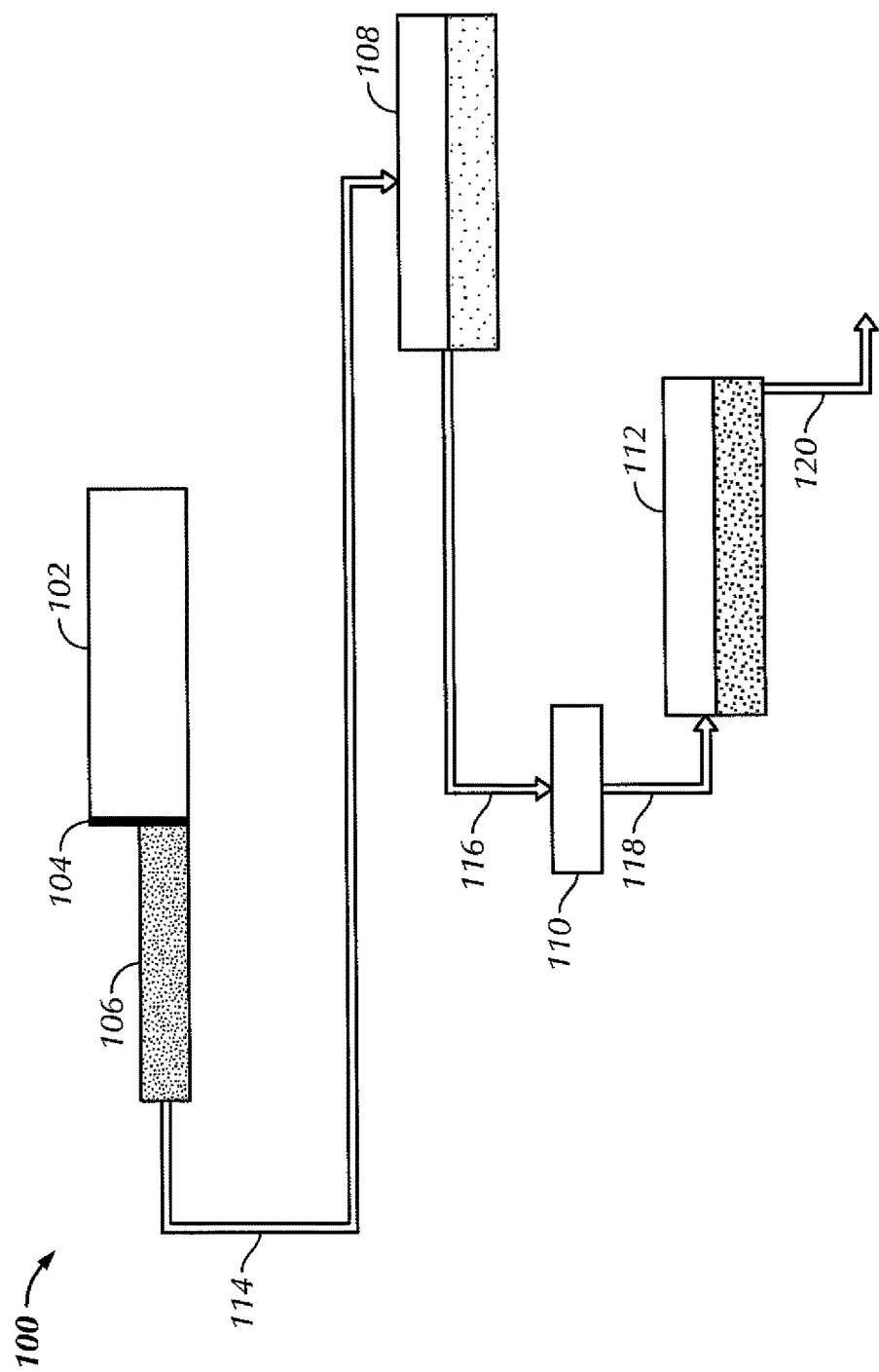
FIG. 1 is an embodiment of a generalized system and flow diagram for treating contaminated wastewater.

A simplified process flow diagram of a system for treating contaminated wastewater is shown in FIG. 1. In one or more embodiments, a process for treating contaminated wastewater may include flowing the contaminated wastewater located in a reservoir 102 behind a bulkhead 104 through an initial filter bed 106 to create stream 114. Stream 114 then flows into and through at least one pre-pond solids filter tank 108 comprising sand to create stream 116. Stream 116 then flows into at least one sedimentation pond 110 to create stream 118. Stream 118 then flows into at least one filter tank 112 comprising sand and a mixture of sand and ZVI to produce treated stream 120, which is then discharged. Stream 120 may have reduced solids content and dissolved inorganic/organic contaminant levels than that of stream 116. In some instances, the initial filter bed 106 may be an optional component in a system to treat contaminated wastewater. In one or more embodiments, the treated wastewater of stream 120, upon discharge from the treatment system, may have less than 10 parts per billion arsenic, less than 65 parts per billion iron, and less than 5 parts per billion suspended solids.

In one or more embodiments, the flow throughout the process may be entirely gravity-based, not relying on any external power sources. In these embodiments, the components (i.e., the filter tanks and settling ponds) of the system may be positioned at different elevations in order to facilitate the gravity-based flow of fluid from component to component during the treating/filtering process. In general, flow rates through the system are based on many factors and treatment systems and processes can have varying designs and in some embodiments may be configured to handle, under gravity-based flow, a flow rate of about 350 to 650 gallons per minute. Capacity can be modified for empirical flow rates. In some embodiments, the system may be equipped with appropriate valving to facilitate the modification of the flow rate and residence time of the contaminated wastewater through the system. For example, valves may be utilized to assist in raising or lowering the contaminated wastewater level upstream from the filtration system in order to increase or decrease the hydrostatic pressure and thus the flow rate within the system. In one or more embodiments, parshall flumes may be located at various points within the system to provide the ability to monitor and measure the flow rate of the fluid within the system and to determine if there are any leaks within the system. In other embodiments, pumps may be used to facilitate flow of contaminated wastewater into, through, and/or out of at least one of the components.

Figure 5:
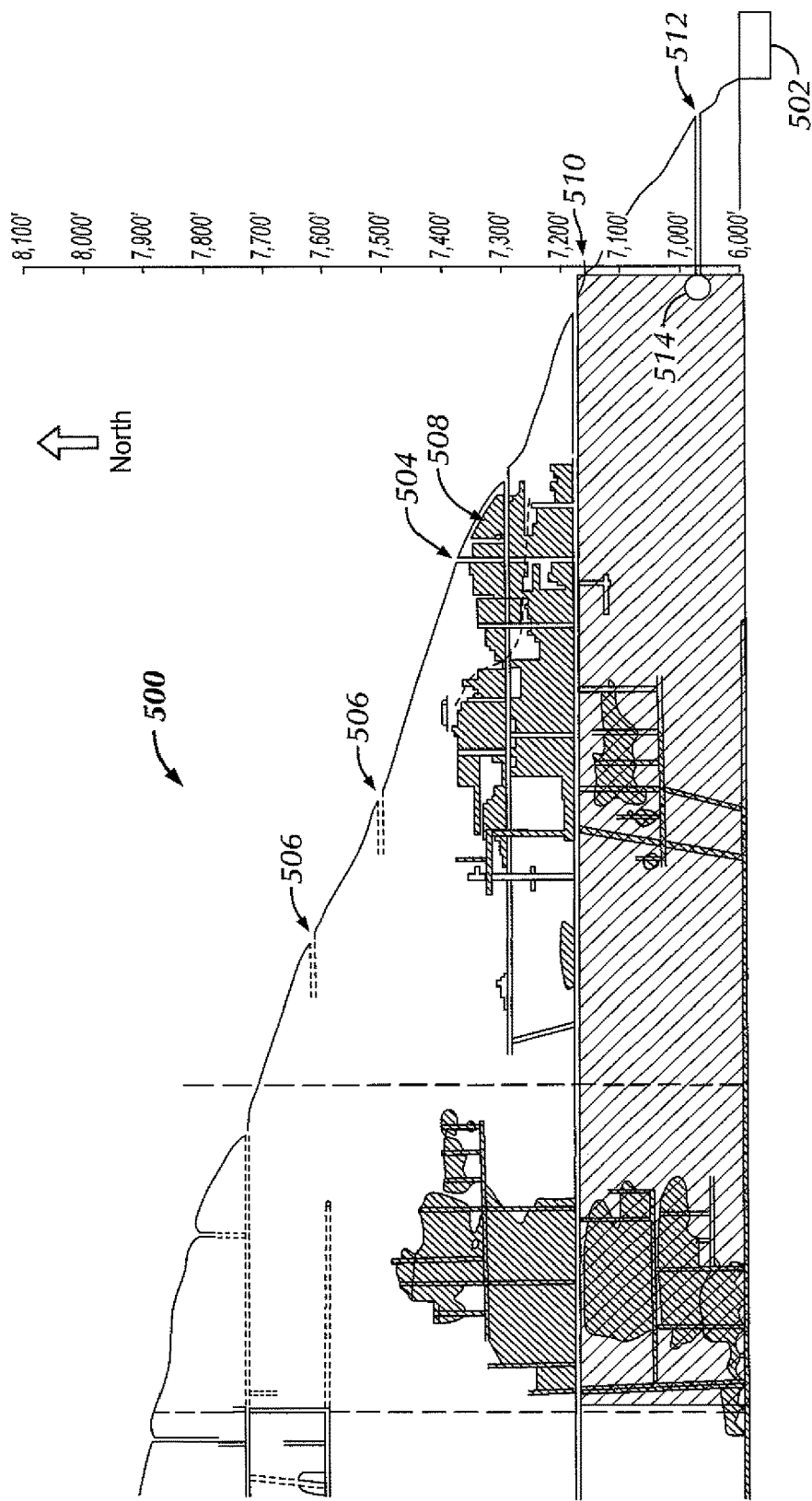
FIG. 5 shows an embodiment of contaminated water being stored within an existing mine excavations upstream from a treatment system prior to its release to the system.

Reservoir 102 serves to hold the contaminated wastewater prior to its entry into the tanks and filter beds of the treatment system. In some embodiments, reservoir 102 may be an aboveground storage system or an underground storage system, for example, existing mine excavations or other natural or man-made repositories underground that may collect water. An existing mine excavation, underground repository, or other containment environment capable of storing wastewater may be capable of supporting the high volumes of contaminated wastewater associated with seasonal changes (if operations producing the wastewater are located outdoors in open systems) or an increase in the industrial activity generating the contaminated wastewater. FIG. 5 shows an embodiment of contaminated water being stored within an existing mine excavation 500 upstream from a treatment system 502 prior to its release to the system 502. The existing mine excavation may contain a variety of tunnels/shafts 504, prospecting caves 506, and excavation/preexisting voids 508 that may serve to store contaminated wastewater. As stated above, the level 510 of the contaminated wastewater in the existing mine excavation 500 may change due to seasonal/environmental variations (e.g., during snow melt in the spring, drought, etc.). At least one taphole 512 may be created in the excavation formation by any known methods in order to remove water from the existing mine excavation 500 for treatment in system 502. In one or more embodiments, at least one taphole 512 may be created in the side of the existing mine excavation 500 and the contaminated wastewater may exit the excavation and flow to the treatment system 502, and in some embodiments flow may be provided by gravity and/or hydrostatic head from within the formation (e.g., without the need for pumps or the like to transport the water from the formation). In some embodiments, the at least one taphole may be fitted with a plug/valve 514 in order to controllably collect and remove water from the existing mine excavation 500 so that it may be treated in treatment system 502.

In some embodiments, a reservoir 102 that is an existing mine excavation or another type of repository may be grouted with a composition comprising ZVI to assist in treating the contaminated wastewater while it is being stored. Further, reservoir 102 may be designed or engineered to allow for control of the flow (rate or amount) of contaminated wastewater into the tanks and filter beds of the treatment system. In other embodiments, reservoir 102, may be a holding tank, or other such structure, and may be located above ground or below ground. While the contaminated wastewater is stored in reservoir 102, contaminants may precipitate and be filtered out by the stratification of the underground formation or otherwise settle to the bottom of the storage area. Thus, wastewater taken from the uppermost portion of reservoir 102 may possess less contaminants than the wastewater in the lower regions of reservoir 102. In one or more embodiments, to initiate the contaminated wastewater treatment process, the uppermost portion of contaminated wastewater located in reservoir 102 may be fed into initial filter bed 106.

The initial filter bed 106 may serve as a coarse filter for any suspended solids that may be in the contaminated wastewater upon the flow of the contaminated wastewater into the system from the reservoir 102. In some embodiments, the initial filter bed 106 may include an upper layer of a gravel base and a lower layer of sand or a mixture of sand and ZVI. The upper layer may be separated from the lower layer by a permeable non-woven or woven geotextile fabric or other material capable of separating the layers and preventing the effects of settling. In some embodiments, ZVI may be added periodically to the initial filter bed 106 by spreading an amount of ZVI over the upper layer or on discrete portions of the upper layer. As a result of the coarse filtration from the gravel base and sand layer and the presence of the ZVI if present, stream 114 may have reduced solids content and dissolved inorganic/organic contaminant levels than the contaminated water located in reservoir 102. In one or more embodiments, the initial filter bed 106 may be agitated periodically thus stirring the upper layer, which may allow some of the ZVI added to the initial filter bed 106 to flow out of the initial filter bed 106 with stream 114 and into a pre-pond solids filter tank 108. The agitation of the initial filter bed 106 may be done through direct action on the initial filter bed 106 with the purpose of agitating the initial filter bed 106 or may be done indirectly (i.e., through the movement of equipment and machinery) without the express purpose of agitating the initial filter bed 106.

The pre-pond solids filter tank 108 including sand, as a filter medium, may serve to initially remove suspended solids that may be in the contaminated wastewater of stream 114 or upon the flow of the contaminated wastewater into the system if the initial filter bed 106 is not included in the system for treating contaminated wastewater 100. In some embodiments, there may be multiple pre-pond solids filter tanks 108 and they may be plumbed and equipped with valves in such a way so that they are connected serially and/or in parallel. When connected serially, the contaminated wastewater may flow through all of the pre-pond solids filter tanks and create a stream 116 that flows to at least one sedimentation pond 110. As a result of the filtration action of the sand, stream 116 may have reduced solids content and, if ZVI is present in the pre-pond solids filter tanks 108, reduced dissolved inorganic/organic contaminant levels than those of the stream of contaminated wastewater entering at least one pre-pond solids filter tank 108. When connected in parallel, the flow of contaminated wastewater may be split prior to entering the pre-pond solids filter tanks 108 and a portion of the flow may be routed to each of the pre-pond solids filter tanks 108 or substantially all of the flow may be routed to one of the pre-pond solids filter tanks 108 leaving the other pre-pond solids filter tank idle. An idle pre-pond solids filter tank may serve as a backup to the active pre-pond solids filter tank(s) 108 and in some instances may receive a small portion of the flow to ensure that the filtration material remains wetted. In some embodiments, a pre-pond solids filter tank 108 may be idled in order to facilitate clean-out and replacement of the filter medium and, during this, substantially no flow through the idled pre-pond solids tank 108 will occur.

After leaving the pre-pond solids filter tank(s) 108, stream 116 may then flow to at least one sedimentation pond 110 where the wastewater may be collected and held for a period of time to allow for further sedimentation of suspended solids. In one or more embodiments, at least one of the bottom and sidewalls of the sedimentation pond 110 may be grouted with a composition comprising ZVI. The grouting composition comprising ZVI may provide an initial level of treatment for the contaminated wastewater within the sedimentation pond 110 before it leaves the sedimentation pond 110 as stream 118 and flows into and through at least one filter tank 112 comprising sand and a mixture of sand and ZVI. As a result of the settling which may occur in the sedimentation pond 110, stream 118 may have reduced solids content and, if the sedimentation pond is grouted with a composition including ZVI, reduced dissolved inorganic/organic contaminant levels than that of stream 116.

The filter tank 112 including sand and a mixture of sand and ZVI may serve to substantially remove the contaminants entering therein from stream 118. In one or more embodiments, the filter tank 112 may be structured to include a first cell comprising a mixture of sand and ZVI and a second cell comprising sand. In some embodiments, the sand and the mixture of sand and ZVI may be included in a single cell or compartment within filter tank 112. Specifically, the ZVI within the filter tank 112 (and also anywhere else within the system), upon contact with a contaminant, may react/interact with the contaminant in various ways in order to remove or remediate the contaminant from the wastewater to produce a treated wastewater stream 120 which may be utilized in any manner appropriate for purified and decontaminated water. Without being bound by theory, contaminants within stream 118 may react/interact with the ZVI present in the filter tanks through mechanisms associated with at least one of: reduction of the contaminant, oxidation of the contaminant, precipitation of the contaminant, co-precipitation of the contaminant, or adsorption/chemisorption of the contaminant. It is believed that upon interaction with the ZVI via these general mechanisms, the contaminants may either be removed from the aqueous phase or may be transformed into a more benign form that is tolerable within the treated wastewater. In one or more embodiments, the mixture of sand and ZVI includes about 10 to 30 percent by volume ZVI homogenously mixed with the sand. In more particular embodiments, the mixture of sand and ZVI includes about 15 to 25 percent by volume ZVI homogenously mixed with the sand. A homogenous mixture with these volumetric ratios of sand and ZVI may prevent the ZVI from clumping and forming masses during the operation of the treatment system 100, thereby maintaining a large active surface area for interacting with the contaminants within the wastewater.

In some embodiments, contaminants within wastewater that may be treated by a system of the present disclosure may be at least one of dissolved metals, halogenated organic compounds including pesticides, nitro aromatic compounds, and nitrates. The dissolved metals may include any ions of copper, iron, titanium, zirconium, hafnium, vanadium, niobium, tantalum, tungsten, rhenium, aluminum, gallium, indium, thallium, silicon, germanium, tin, lead, arsenic, antimony, bismuth, selenium, tellurium, zinc, nickel, tin, lead, cadmium, cobalt, mercury, chromium, manganese, silver, gold, platinum, palladium, vanadium, arsenic, antimony, bismuth, indium, rhodium, ruthenium, technetium, molybdenum, niobium, osmium, iridium, uranium, plutonium, any lanthanides or actinides, or any mixtures of those metals listed above.

In some embodiments, the stream 118 of contaminated wastewater discharged by the sedimentation pond 110 may enter the upper portion of the filter tank 112 and flow downward through the sand and the mixture of sand and ZVI into an underdrain system for discharge of the treated wastewater 120. In other embodiments, the stream 118 of contaminated wastewater discharged from the sedimentation pond 110 may enter the lower portion of the filter tank 112 and flow upward through the sand and the mixture of sand and ZVI due to the hydrostatic pressure of the gravity induced flow and into a drain system for discharge of the treated wastewater 120. In some embodiments, after flowing through the sand and the mixture of sand and ZVI, the treated wastewater may further flow through a filter bed comprising sand for the removal of any suspended solids which may have been created by the action of the ZVI on the contaminants. In some embodiments, there may be multiple filter tanks and they may be plumbed and equipped with valves in such a way so that they are connected serially and/or in parallel. When connected serially, the contaminated wastewater may flow through all of the filter tanks before discharging treated wastewater. When connected in parallel, the stream 118 of contaminated wastewater from the sedimentation ponds may be split prior to entering the filter tanks and a portion of the flow may be routed to each of the filter tanks or substantially all of the flow may be routed to one of the filter tanks leaving the other filter tank(s) idle. An idle filter tank may serve as a backup to the active filter tank(s) (i.e., in instances of sudden increases in the amount of wastewater flow) and in some instances may receive a small portion of the stream 118 to ensure that the filtration material remains wetted. In some embodiments, a filter tank may be idled in order to facilitate clean-out and replacement of the filter medium from the filter tank.

Figure 2:
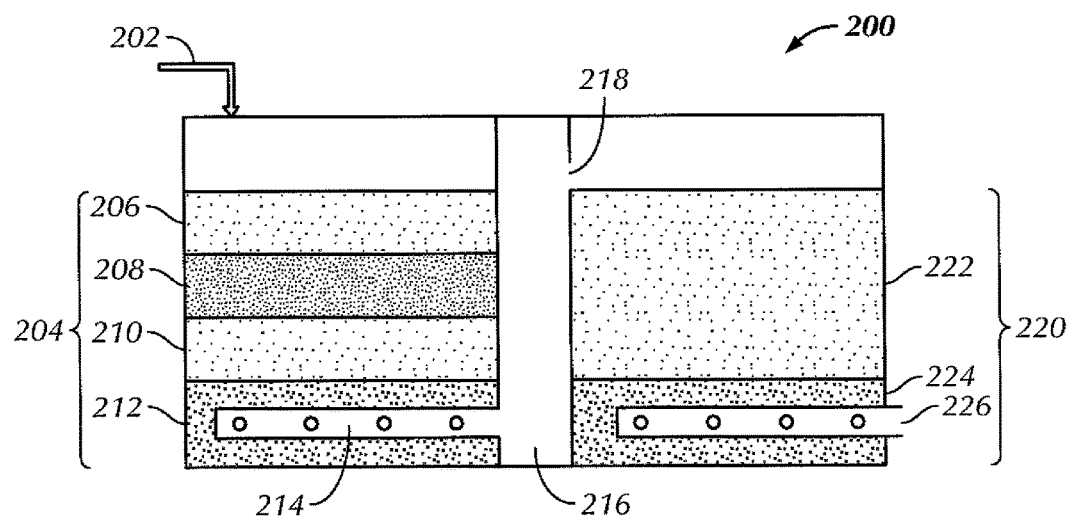
FIG. 2 shows an embodiment of a filter tank comprising sand and a mixture of sand and zero-valent iron.

FIG. 2 shows an embodiment of a filter tank 200 comprising sand and a mixture of sand and ZVI. In this embodiment, the flow 202 of contaminated wastewater from the sedimentation ponds enters the upper portion of a first treatment cell 204 within filter tank 200. The first treatment cell 204 includes an upper layer 206 of sand, an intermediate layer 208 of a mixture of sand and ZVI, a lower layer 210 of sand, with a lowermost layer 212 including a gravel filter bed surrounding a tank underdrain 214. The contaminated wastewater upon entering the upper portion of a first treatment cell 204 within the filter tank 200 flows downward through the layers before entering the tank underdrain 214, which directs the flow of treated wastewater to an upwell chamber 216. Through the action of the hydrostatic pressure of the gravity based flow within the system, the treated wastewater flows upward within the upwell chamber 216 before reaching the top of the weir wall 218 where an opening allows the treated wastewater to enter a second treatment cell 220. The second treatment cell 220 includes an upper layer 222 of sand and a lower layer 224 of a gravel filter bed surrounding a tank underdrain 226 for discharging the treated wastewater from the filter tank 200 after it flows downward through the layers of filter media.

Figure 3:
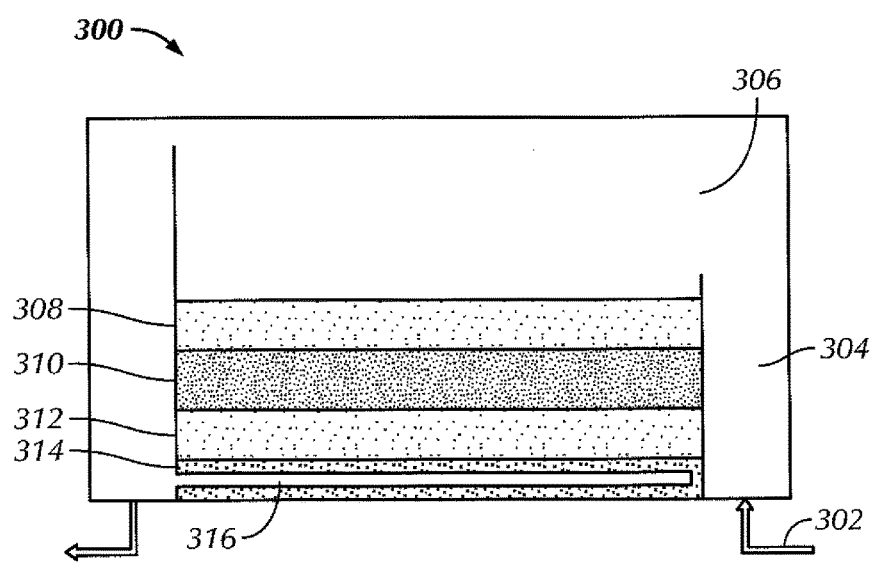
FIG. 3 shows an embodiment of a filter tank comprising sand and a mixture of sand and zero-valent iron.

FIG. 3 shows an embodiment of a filter tank 300 including sand and a mixture of sand and ZVI. In this embodiment, the flow 302 of contaminated wastewater from the sedimentation ponds enters an upwell chamber 304 of the filter tank 300 and rises within the upwell chamber due to the hydrostatic pressure from the gravity based flow until reaching an opening 306 where the contaminated wastewater flows onto the filter media. The filter media includes an upper layer 308 of sand, an intermediate layer 310 of a mixture of sand and ZVI, a lower layer 312 of sand, and a lowermost layer 314 of a gravel filter bed surrounding a tank underdrain 316 for discharging the treated wastewater from the filter tank 300.

In one or more embodiments, the porosity of the filtration media used within the tanks (i.e., the sand and the mixture of ZVI and sand) as a fraction of the volume of voids over the total volume may be from about 40 to 60 percent. In more particular embodiments, the porosity of the filtration media may be from about 45 to 55 percent.

In some embodiments, a system for the treatment of contaminated wastewater as described above may operate continuously to treat contaminated wastewater for about 6-12 months with consistent treatment levels and no need for replacing the filter media used. Upon reacting/interacting over a period of time with contaminants in the wastewater, the ZVI may change from a grayish/black color to a more rusty/red color indicating the occurrence of oxidation. The change in color may be used as a rough indicator of the need for maintenance of the filter tanks and the removal of the spent ZVI and the addition of a fresh ZVI mixture. In some embodiments, the resistance to flow through the mixture of ZVI and sand may also help to determine the need for a filter media change. Contaminant material becomes trapped either at or downstream from the mixture of ZVI and sand as the ZVI reacts/interacts with the contaminants to form precipitates or adsorbs/chemisorbs the contaminants. This increase in solid material within the filter media reduces the porosity of the filter media thereby increasing the resistance to flow, which can be observed in the system as an increase in the elevation of the surface of the contaminated wastewater present in the filter tank(s) prior to filtering through the filtration media. In some embodiments, the contaminant levels in the treated wastewater being discharged from the filter tank(s) may be a more accurate way of identifying the need for filter tank maintenance and replenishment of the ZVI mixture within the filter tanks.

In some embodiments, the spent ZVI that is collected from the filter tanks may be added to the initial filter bed and/or the pre-pond solids filters. The spent ZVI may still have a small amount of treatment capacity for contaminants, as previously detailed, and its use within these initial filtration components will still effectively remove suspended solids from the contaminated wastewater while also providing treatment of the dissolved contaminants within the wastewater. In some embodiments, spent ZVI, whether from the filter tanks or from the initial filter bed or pre-pond solids filter, may be removed from the system and disposed of at an appropriate location. The spent ZVI may be disposed of underground by burying or in an open pit, as the spent ZVI may effectively trap the removed wastewater contaminants and prevent the contaminants from leaching back into the environment upon its disposal.

In some embodiments, the spent ZVI may contain contaminants that may have value upon their recovery. For example, depending on the source of the contaminated wastewater, the spent ZVI may have reacted/interacted with valuable metal contaminants including copper, gold, silver, palladium, and platinum among others. The reaction/interaction of these metal contaminants with the ZVI may have resulted in the trapping of the metal in close association with the ZVI as either an adsorbed body or a precipitate onto the ZVI particle surface or trapped within the filter media. In these embodiments, it may be possible to process the spent ZVI and sand mixture in a way amenable to the recovery of the valuable metal contaminants.

In one or more, embodiments, the system described above may be equipped with system for adding ferric compounds and/or calcium compounds to the contaminated wastewater. In some embodiments, the ferric compound added to the contaminated wastewater may be ferric sulfate, for example, Kemira Ferix-3, available from Kemira. In some embodiments, the calcium compound may be calcium hydroxide, for example, slaked lime. The system for adding ferric and calcium may be placed at any point within the system. In a particular embodiment, the unit may be placed upstream of the sedimentation ponds. The addition of ferric and calcium may assist in modulating the pH of the contaminated wastewater to about 7 and also may facilitate the sedimentation and removal of contaminants from the wastewater. In some embodiments, the ferric and calcium addition unit may serve as a backup to the system described above and only be operational during periods of heavy flow rate (i.e., caused by rainfall if the system is located outdoors) when the contaminated wastewater may not have enough residence time within the system to properly react/interact with the ZVI and be fully treated.

Figure 4:
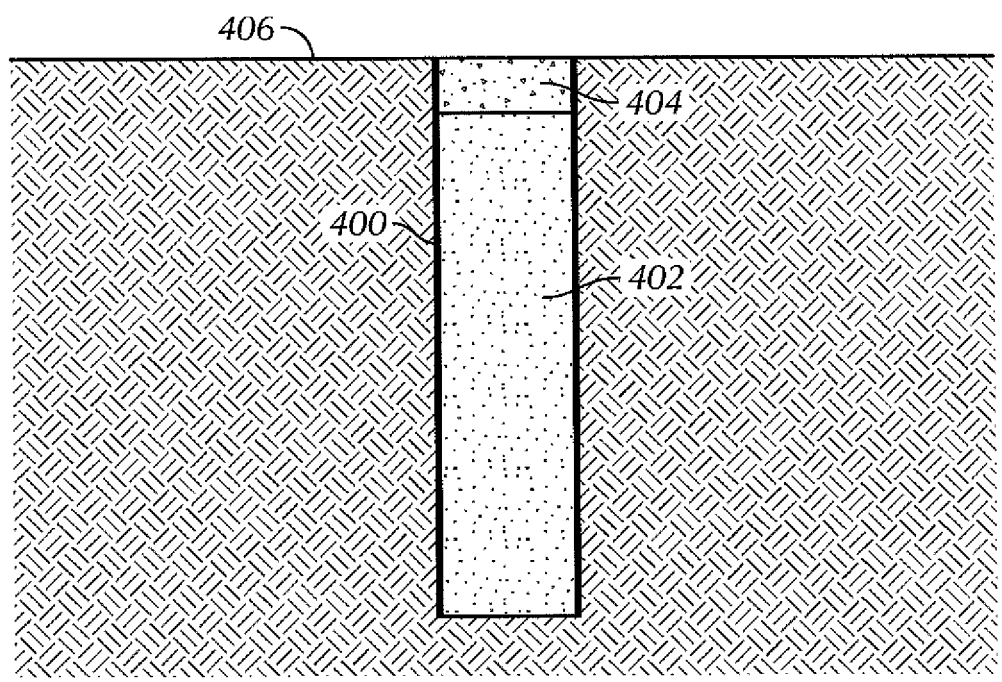
FIG. 4 shows an embodiment of a wellbore grouted with a composition comprising sand and zero-valent iron.

Further, in some embodiments, it may be beneficial to grout abandoned wellbores with a composition comprising ZVI. Wellbores related to geotechnical borings, environmental monitoring wells, or other soil borings that are to be abandoned may require grouting with a plugging material to prevent the possibility of abandoned wells and/or borings from providing a means for contaminants to enter the groundwater, prevent the possibility of personal injury and to prevent the intermixing of separate water bearing zones. In an embodiment shown in FIG. 4, the wellbore 400, once it is deemed ready for abandonment, may be filled with a grouting composition 402 including ZVI to within about two feet of the top of the wellbore with the last two feet 404 being filled with cement or clean soil to ensure a solid surface exists at the ground surface 406. The grouting composition including ZVI may be used to substantially fill the wellbore or in some embodiments, may be used to fill at least one selected interval of the wellbore with a conventional grouting composition used for the intervals of the wellbore where the grouting composition with ZVI is not used. In some embodiments, the grouting composition may be a shotcrete mixture (i.e., comprising sand, cement, and gravel mixed with approximately 15% by volume ZVI).

A system, as described above, for treating contaminated wastewater that utilizes ZVI and gravity-based flow may provide a simple and cost effective treatment for a variety of inorganic and organic contaminants, operate over a long period of time, and require minimal operator intervention during treatment. Importantly, the liquid effluent produced by a treatment system created according to the description above is capable of meeting stringent standards currently imposed for contaminants in water. In some instances the treatment system also traps the contaminants in an inert state within the solid filtration media (sand and ZVI), ensuring that the future risk of leaching and contamination from the contaminants is negligible.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A process for treating contaminated mining wastewater, comprising:
   flowing the contaminated mining wastewater into at least one initial filter bed comprising a layer of gravel on top of a layer comprising a mixture of sand and zero-valent iron;
   flowing the contaminated mining wastewater from the at least one initial filter bed into at least one pre-pond solids filter tank comprising sand;
   flowing the contaminated mining wastewater from the at least one pre-pond solids filter tank into at least one sedimentation pond;
   flowing the contaminated mining wastewater from the at least one sedimentation pond into at least one filter tank comprising at least one layer of sand and at least one layer of a mixture of sand and zero-valent iron; and
   discharging treated mining wastewater from the at least one filter tank;
   wherein the treated wastewater upon discharge has less than 10 parts per billion arsenic, less than 65 parts per billion iron, and less than 5 parts per billion suspended solids.

2. The process of claim 1, wherein the flowing during the process is gravity-based.

3. The process of claim 1, wherein the mixture of sand and zero-valent iron has about 10 to 30 percent by volume zero-valent iron.

4. The process of claim 1, further comprising collecting spent zero-valent iron from at least one filter tank.

5. The process of claim 4, further comprising adding at least some of the collected spent zero-valent iron to at least one pre-pond solids filter tank.

6. The process of claim 1, wherein at least one filter tank comprises two treatment cells, with the first treatment cell, comprising the mixture of sand and zero-valent iron, receiving the flow of contaminated wastewater from at least one sedimentation pond prior to transferring the flow of treated wastewater to the second treatment cell comprising sand.

7. The process of claim 1, wherein at least one filter tank comprises an upper layer of sand, an intermediate layer of a mixture of sand and zero-valent iron, and a lower layer of sand.

8. The process of claim 1, wherein the at least one sedimentation pond is grouted with a composition comprising zero-valent iron.

9. The process of claim 1, wherein there are at least two filter tanks connected in-series or in-parallel to receive water from the at least one sedimentation pond.

10. The process of claim 1, further comprising adding zero-valent iron to the initial filter bed.

11. The process of claim 10, further comprising agitating the initial filter bed and flowing a portion of the zero-valent iron from the initial filter bed into the pre-pond solids filter tank.

12. A process for treating contaminated wastewater, comprising:
   flowing the contaminated wastewater into at least one pre-pond solids filter tank comprising sand;
   flowing the contaminated wastewater from at least one pre-pond solids filter tank into at least one sedimentation pond;
   flowing the contaminated wastewater from at least one sedimentation pond into at least one filter tank comprising at least one layer of sand and at least one layer of a mixture of sand and zero-valent iron; and
   discharging treated wastewater from at least one filter tank;
   wherein at least one of a bottom and a sidewall of the sedimentation pond is grouted with a composition comprising zero-valent iron.

* * * * *